(12) United States Patent
Maston

(10) Patent No.: US 10,260,954 B2
(45) Date of Patent: *Apr. 16, 2019

(54) INFRARED TEMPERATURE MEASUREMENT AND STABILIZATION THEREOF

(71) Applicant: Robert A. Maston, Columbus, OH (US)

(72) Inventor: Robert Maston, Columbus, OH (US)

(73) Assignee: CVG MANAGEMENT CORPORATION, New Albany, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 15/312,265

(22) PCT Filed: May 14, 2015

(86) PCT No.: PCT/US2015/030769
§ 371 (c)(1),
(2) Date: Nov. 18, 2016

(87) PCT Pub. No.: WO2015/179202
PCT Pub. Date: Nov. 26, 2015

(65) Prior Publication Data
US 2017/0122811 A1   May 4, 2017

Related U.S. Application Data

(63) Continuation of application No. 14/281,334, filed on May 19, 2014, now Pat. No. 9,228,902, which is a (Continued)

(51) Int. Cl.
*G01J 5/10* (2006.01)
*G01J 5/04* (2006.01)
*G01J 5/06* (2006.01)

(52) U.S. Cl.
CPC ............... *G01J 5/10* (2013.01); *G01J 5/041* (2013.01); *G01J 5/046* (2013.01); *G01J 5/048* (2013.01); *G01J 5/061* (2013.01)

(58) Field of Classification Search
CPC .. G01J 5/041; G01J 5/048; G01J 5/061; G01J 2005/063; G01J 2005/068; G01J 5/48
(Continued)

(56) References Cited

U.S. PATENT DOCUMENTS

| | | | | |
|---|---|---|---|---|
| 4,805,009 A | * | 2/1989 | Pryor | H01L 23/06 257/729 |
| 5,296,724 A | * | 3/1994 | Ogata | G02B 6/4204 257/680 |

(Continued)

FOREIGN PATENT DOCUMENTS

| | | |
|---|---|---|
| EP | 1568975 | 8/2005 |
| EP | 1857795 | 11/2007 |

OTHER PUBLICATIONS

Extended European Search Report for European Patent Application No. 15795558.4 dated Jan. 8, 2018; 7 pages.

*Primary Examiner* — Taeho Jo
(74) *Attorney, Agent, or Firm* — Walter Haverfield LLP; James J. Pingor

(57) ABSTRACT

Infrared (IR) temperature measurement and stabilization systems, and methods related thereto are provided. One or more embodiments passively stabilizes temperatures of objects in proximity and within the path between an infrared (IR) sensor and target object. A protective housing may encase an IR sensor, which may include a sensing element or IR element, a circuit or signal processor, and a housing seal plug. The IR element may be thermally bonded with a frame or conductive top hat.

17 Claims, 17 Drawing Sheets

Related U.S. Application Data continuation-in-part of application No. 13/178,077, filed on Jul. 7, 2011, now Pat. No. 8,785,856.

(60) Provisional application No. 61/362,623, filed on Jul. 8, 2010.

(58) Field of Classification Search
USPC .......................................................... 250/340
See application file for complete search history.

(56) References Cited

U.S. PATENT DOCUMENTS

| | | | | | |
|---|---|---|---|---|---|
| 5,952,803 | A | * | 9/1999 | Canada | G01R 31/343 318/558 |
| 5,991,652 | A | * | 11/1999 | Barthelemy | G01J 5/04 374/208 |
| 6,129,673 | A | * | 10/2000 | Fraden | G01J 5/04 374/E13.003 |
| 6,133,569 | A | * | 10/2000 | Shoda | G01J 5/061 250/330 |
| 6,149,297 | A | * | 11/2000 | Beerwerth | G01J 5/02 340/541 |
| 6,335,548 | B1 | * | 1/2002 | Roberts | H01L 23/49562 250/239 |
| 6,741,408 | B2 | * | 5/2004 | Beattie | G01J 3/14 359/820 |
| 6,855,886 | B2 | * | 2/2005 | Kawamura | H01L 31/0203 174/357 |
| 8,143,717 | B2 | * | 3/2012 | Medeiros, III | H01L 23/055 257/710 |
| 2001/0026011 | A1 | * | 10/2001 | Roberts | B60Q 1/2665 257/678 |
| 2001/0027274 | A1 | | 10/2001 | Pompei | |
| 2002/0071190 | A1 | * | 6/2002 | Wada | G02B 7/021 359/819 |
| 2002/0101508 | A1 | * | 8/2002 | Pollack | G01N 21/8507 348/85 |
| 2003/0168670 | A1 | * | 9/2003 | Roberts | B60Q 1/2665 257/98 |
| 2004/0022297 | A1 | * | 2/2004 | Tabata | G01J 5/02 374/120 |
| 2004/0182591 | A1 | * | 9/2004 | Kawamura | H01L 31/0203 174/529 |
| 2004/0233968 | A1 | * | 11/2004 | Tabata | G01J 5/02 374/121 |
| 2005/0133810 | A1 | * | 6/2005 | Roberts | B60Q 1/2665 257/99 |
| 2006/0002818 | A1 | * | 1/2006 | Belz | B01L 3/502 422/400 |
| 2006/0043297 | A1 | * | 3/2006 | Ouvrier-Buffet | G01J 3/36 250/339.05 |
| 2007/0078254 | A1 | * | 4/2007 | Matsumoto | G02B 1/041 528/44 |
| 2008/0048121 | A1 | * | 2/2008 | Hinnrichs | G01J 5/061 250/340 |
| 2009/0086342 | A1 | * | 4/2009 | Seki | G02B 7/028 359/820 |
| 2009/0098685 | A1 | * | 4/2009 | Duboc | B81B 7/0077 438/116 |
| 2009/0140284 | A1 | * | 6/2009 | Kurino | C08G 83/001 257/100 |
| 2009/0296775 | A1 | * | 12/2009 | Yamaguchi | G01J 5/04 374/121 |
| 2011/0228811 | A1 | * | 9/2011 | Fraden | G01J 5/061 374/130 |
| 2012/0006989 | A1 | | 1/2012 | Maston | |
| 2012/0287255 | A1 | * | 11/2012 | Ignatovich | A61B 3/1208 348/78 |

* cited by examiner

1400

INFRARED TEMPERATURE MEASUREMENT AND STABILIZATION THEREOF

CROSS-REFERENCE TO RELATED APPLICATIONS

This application claims priority to U.S. Non-provisional patent application, Ser. No. 14/281,334 entitled "INFRARED TEMPERATURE MEASUREMENT AND STABILIZATION THEREOF", filed on May 19, 2014, which is a continuation-in-part (CIP) and claims priority to U.S. Non-Provisional patent application, Ser. No. 13/178,077 entitled "INFRARED TEMPERATURE MEASUREMENT AND STABILIZATION THEREOF", filed on Jul. 7, 2011 which claims the benefit of U.S. Provisional Patent Application, Ser. No. 61/362,623 entitled "INFRARED TEMPERATURE MEASUREMENT AND STABILIZATION THEREOF", filed on Jul. 8, 2010. The entireties of the above-noted applications are incorporated by reference herein.

BACKGROUND

Infrared (IR) temperature sensors can monitor infrared light which is then converted into an electrical signal and ultimately to a temperature reading. The spectrum of infrared radiation cannot be readily seen by humans without the use of specially designed equipment that makes the spectrum visible. Measurement of infrared waves is calibrated in microns, ranging from 0.7 to 1000 microns. Today, infrared temperature sensors can be used to measure temperature of almost any type of moving part or object, including many used related to vehicles.

One of the most basic IR temperature sensor designs consists of a lens that focuses IR energy onto to a detector. The detector can convert the measured energy to an electrical signal, which can be displayed in units of temperature. An object's emissivity is used together with the captured energy in order to convert measured energy into temperature. Today, more sophisticated sensors can passively compensate for ambient temperature variations so as to effect accurate measurement of a target object.

One very useful feature of IR sensors is the ability to measure temperatures, e.g., without physical contact. This temperature monitoring ability is especially useful in situations where objects are in motion, e.g., in vehicular applications. Unfortunately, environmental effects upon the sensor require protective housings and the like to be installed to protect the sensors from environmental elements. Protective housings and the like include materials that vary in temperature and contribute to the IR energy path of the sensor thereby making accurate and efficient temperature measurements difficult.

With regard to conventional IR temperature sensors, significant measurement errors often occur when the IR sensor, e.g., thermopile, is subject to thermal conditions such as a wide range in operating temperatures, temperature rate of change, or static thermal gradients in the sensing region or path. Any IR visible object in the path between the sensing component and the measurement target will both deliver energy to the sensor as well as block a portion of the thermal energy emitted by object target; resulting in accurate and inefficient temperature measurement.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

According to one or more aspects, one or more embodiments include infrared (IR) temperature measurement and stabilization systems, and methods related thereto. One or more embodiments actively stabilizes temperatures of objects in the path between an IR sensor and target object. A temperature monitor and controller is employed to regulate power to resistive temperature devices (RTDs) thereby regulating current (and power) to the RTDs. As a result, temperatures of IR visible objects can be actively stabilized for changes, for example, changes in ambient temperatures.

With regard to traditional infrared (IR) temperature sensors, significant measurement errors often occur when the IR sensor, e.g., thermopile, is subject to thermal conditions such as a wide range in operating temperature, temperature rate of change, or static thermal gradients in the sensing region. IR visible objects in the path between the sensing component and the measurement target will both deliver energy to the sensor as well as block a portion of the thermal energy emitted by object target. In accordance with one or more aspects, intermediate media, such as optical lens and protective window, are held thermally stable thereby allowing their energy contributions to be known and precisely compensated for by the measurement system. As well, other components in the sensing region can be stabilized via RTDs, e.g., sensor housing, baseplate, etc.

Accordingly, one or more aspects can deliver a final temperature indication response time that is significantly reduced by actively stabilizing the key measurement components. Temperature compensation, including both sensor steady-state temperature and rate of change dependencies, can be significantly reduced or eliminated by actively stabilizing the key measurement components by way of RTDs together with temperature control components and circuitry.

In other aspects, passive stabilization of temperatures of objects in a path between a sensor and a target object is provided. In these aspects passive thermal stabilization is accomplished via conductively coupling the sensor to optics.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DETAILED DESCRIPTION

Figure 1:
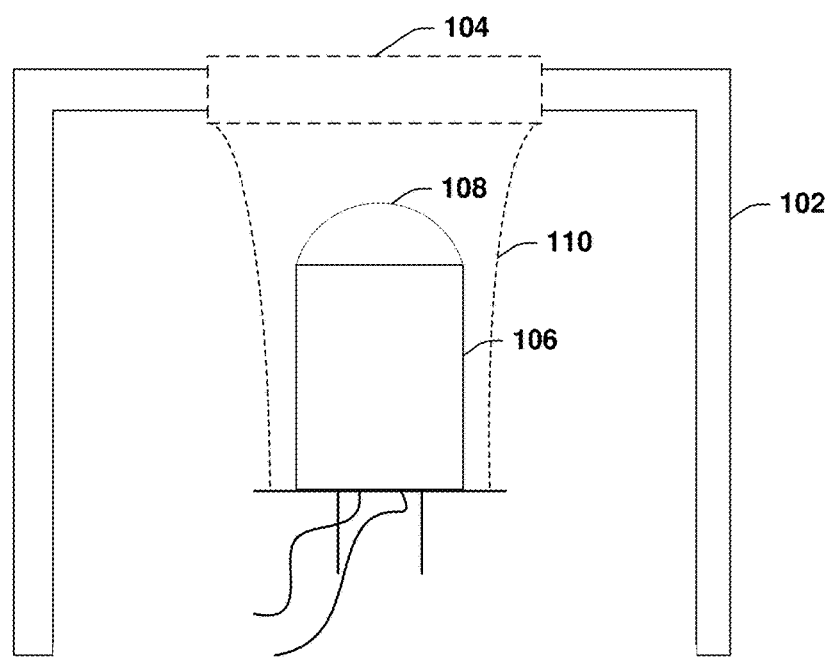
FIG. 1 is an illustration of an example infrared (IR) temperature sensor system capable of component stabilization, according to one or more embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

As will be described in greater detail infra, one or more embodiments provides for stabilization of critical measurement components as well as other 'visible' objects in an infrared (IR) temperature measurement system. One or more embodiments can effectively stabilize interference caused by a protective cap or housing as well as other IR 'visible' components in close proximity to the IR sensor. As will be understood, IR thermal measurement is highly susceptible to the thermal energy state and flux of both the sensing element and IR 'visible' media in (and around) the target-object path. Active stabilization of the thermal energy or absolute temperature of these system components is one underlying principal of this disclosure. This temperature stabilization enhances accuracy and can be performed at an efficient rate as compared to conventional IR sensor systems.

Referring initially to the drawings, FIG. 1 illustrates an example IR temperature sensor system 100 capable of active component temperature stabilization. Generally, the system 100 can include a protective housing 102 (e.g., molded plastic cap) having an integral window or lens 104. It will be appreciated that the lens 104 (e.g., transparent window) enables measurement of IR energy via IR temperature sensor 106 (e.g., thermopile). It will be appreciated that this window can be manufactured of the same material as the protective housing 102. Thus, variations in temperature of the window 104 effects accuracy of IR measurements until its temperature is stabilized. It will be appreciated that the window 104 can often represent 30 to 50% of the energy detected by thermopile 106. For at least this reason, one or more embodiments is capable of stabilizing the temperature of the window 104 such that compensation can efficiently and effectively be made to enhance accuracy of the sensing device 106. As shown, the temperature sensor 106 is equipped with optics 108, which can also vary in temperature and effect performance of the thermopile 106.

Because the temperature of the window 104 fluctuates often during operation, a heat source is provided to stabilize its temperature thereby increasing performance of the IR temperature monitoring functionality. Additionally, because the window 104 is most often manufactured of plastic, fluctuations in temperature are slow as plastic is not an efficient conductor of heat. An example conductive metal frame equipped with resistive temperature devices (RTDs) will be described in greater below. This conductive metal is deposited on the inner side of the protective housing 102 and can focus heat upon the window 104. It will be understood and appreciated that other aspects can include an optional temperature directional means (e.g., cone-like device) that captures heat from a conductive source equipped with RTDs and channels that heat to the window 104 and components of the sensor 106. In other words, in one or more aspects and environments, the heating effects and efficiency as described herein can be affected by the low conductivity of the captive air within the protective housing. By providing a temperature channeling means, e.g., funnel, (illustrated as dashed lines 110), heat can be contained within the inner area of the cone, thereby enhancing stabilization effects.

It will be appreciated that measurement system errors of several degrees exists under current or traditional measurement techniques. Laborious, time consuming and expensive calibration processes are required to compensate over varying temperature ranges. Other techniques have been attempted to passively control temperature of intermediate media using insulating and conducting materials. Unfortunately, these techniques are complicated and result in delayed temperature readings. Further, passive control of intermediate media temperatures oftentimes results in error or inaccurate readings. It will be appreciated many applications require high accuracy in IR temperature measurements. The active temperature stabilization systems of one or more embodiments can provide this accuracy.

Traditionally, intrinsic errors in IR temperature measurements were tolerated. Additionally, the optical lens or raw sensor was protected from environmental elements by looking through narrow chambers or long tubes. Still further, in accordance with traditional systems, environmentally protective barriers were removed as they led to complexity that resulted in inaccurate readings. Devices took a long time in temperature stable environments to indicate accurately.

In accordance with traditional systems, temperature compensation is currently handled by collecting sensor responses over a wide range of temperatures. Thereafter, the indication is adjusted using sensor unique correction factors. This is both time consuming and leads to compromised accuracy. Large thermal masses are added to slow temperature rates of change and to resolve thermal gradients. Unfortunately, this approach leads to enhanced device size and longer thermal response times.

The measurement system 100 of FIG. 1 can actively control the thermal environment of key components of the IR measurement system. Following is a review of options available to stabilize temperatures. One technique of the sensor systems allows the sensor 106 to come into thermal equilibrium shortly after the environment temperature and heat sources stabilize. To accomplish this, the thermopile sensor 106 is exposed directly to the environment with little or no protection from corrosive or harsh environments. This direct exposure is needed in order for its temperature to track the environmental temperature in a reasonable amount of time. Unfortunately, direct exposure results in damage and corrosive elements upon the sensor.

Another alternative technique employs thermal separation of heat sources, such as power dissipating electronic components, while enhancing passive thermal conduction between a protective cover and environmental media heat transfer. It will be understood that traditional products have limited performance over wide ambient temperature range.

Overall, the IR system 100 of FIG. 1 can offer improved accuracy in view of conventional systems by way of active temperature stabilization. Additionally, more accurate temperatures can be rendered in a faster response time. The system 100 employs simplification that results in reduced time related to the calibration process. Overall end cost can be reduced in view of the efficiencies offered by the features, functions, and benefits of the disclosure. Still further, the sensor 106 and system 100 can have a wider application base. Thus, one or more embodiments may provide a versatile system adaptable to a wide range of uses or applications.

Figure 2:
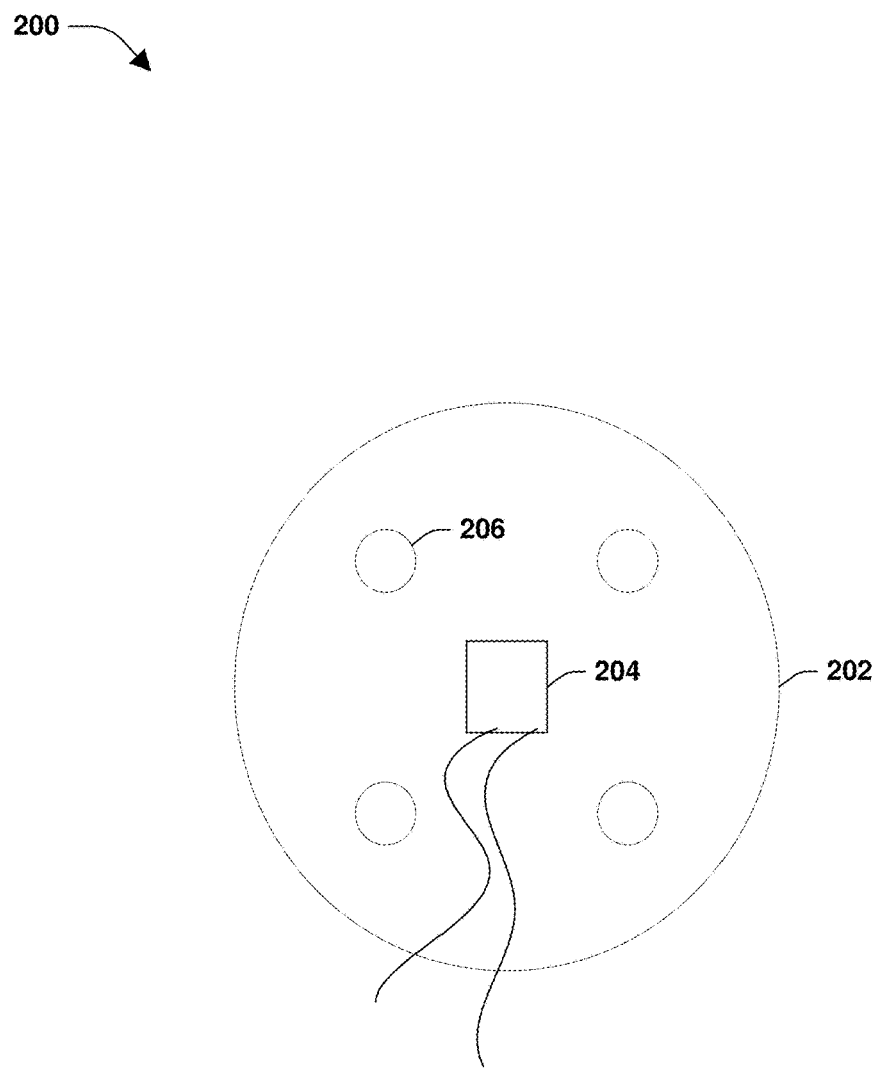
FIG. 2 is an illustration of an example bottom view of a self-heating temperature sensor system, according to one or more embodiments.

Turning now to FIG. 2, a bottom view of an example self-heating temperature sensor 200 is shown. Item 202 is illustrative of a baseplate of the thermopile of FIG. 1. An RTD 204 capable of detecting and generating heat can be thermally bonded to the baseplate 202. Accordingly, in addition to detecting thermal power, RTD 204 can also generate heat thereby stabilizing the temperature of the baseplate 202, along with other components of the system. Lead apertures 206 are shown and provide means by which thermopile leads can traverse the baseplate 202 to accompanying circuitry.

Figure 3:
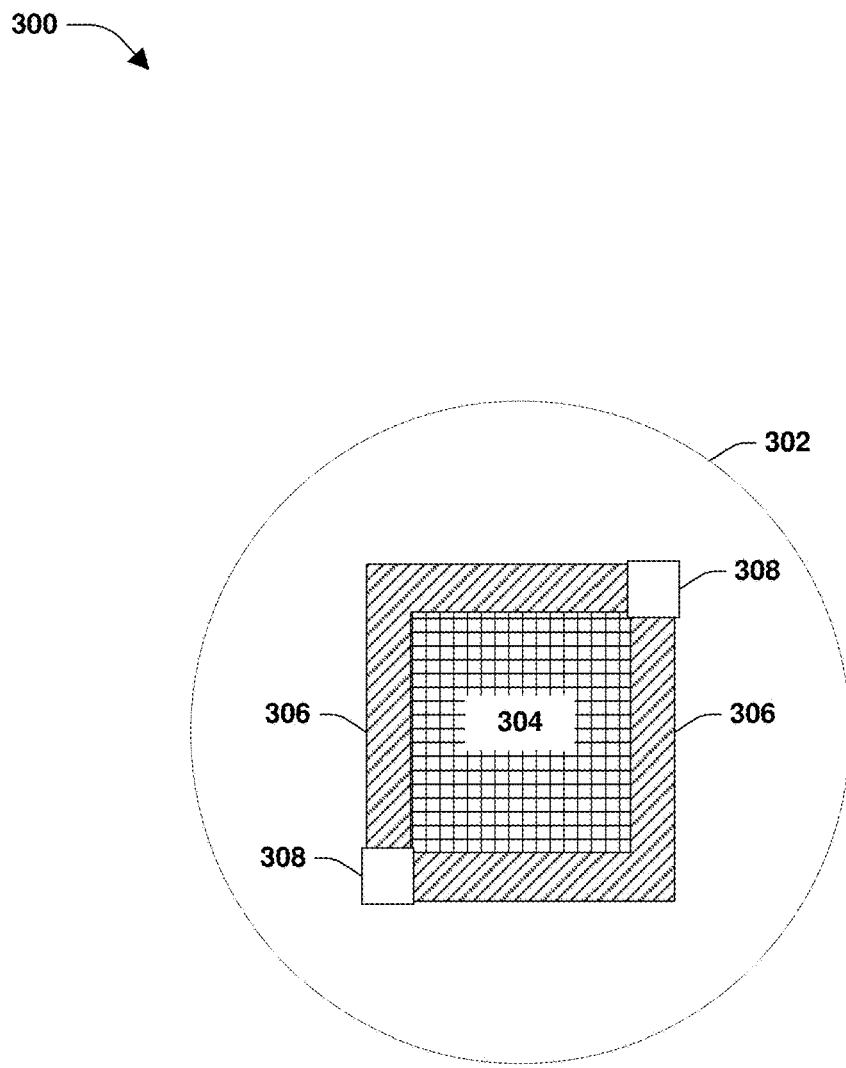
FIG. 3 is an illustration of an example top-down view of a self-heating temperature sensor system, according to one or more embodiments.

FIG. 3 illustrates a top view of an example stabilization system 300 in accordance with one or more aspects. Generally, system 300 includes a protective cover 302 having a lens 304 (or window) provided on the top surface of the protective cover (302). In aspects, the window 304 is integral to the cover however, can also be a separate component in alternative designs. As described supra, the protective cover 302 encases components of an IR sensor system (e.g., system 100 of FIG. 1).

The temperature and temperature movement of the lens 304 (or window) is effectively noise to the IR detection of the system resulting in inaccurate readings. In accordance thereto, one or more embodiments provides for temperature stabilization of the lens 304. Essentially, the lens 304 is an IR transmissive window 304 bordered by a metalized copper (Cu) frame 306. The frame 306 is deposited upon the inner surface of the protective cover 302 and can focus heat around the window 304. While a square frame is shown, it will be understood that other shapes and deposits of conductive material (e.g., copper) that focus heat upon the window 304 can be employed without departing from the spirit and/or scope of the disclosure. Additionally, other conductive metals, e.g., platinum, silver, etc. can be employed in alternative aspects. Self-heating resistive temperature sensors 308 (e.g., RTDs) can be provided so as to control the self-heating functionality of one or more embodiments. It will be understood that the RTDs 308 can detect and deliver thermal power as appropriate for temperature stabilization. While two RTDs are shown, other aspects can employ additional or fewer RTDs as appropriate without departing from the scope of the disclosure or claims appended hereto.

Figure 4:
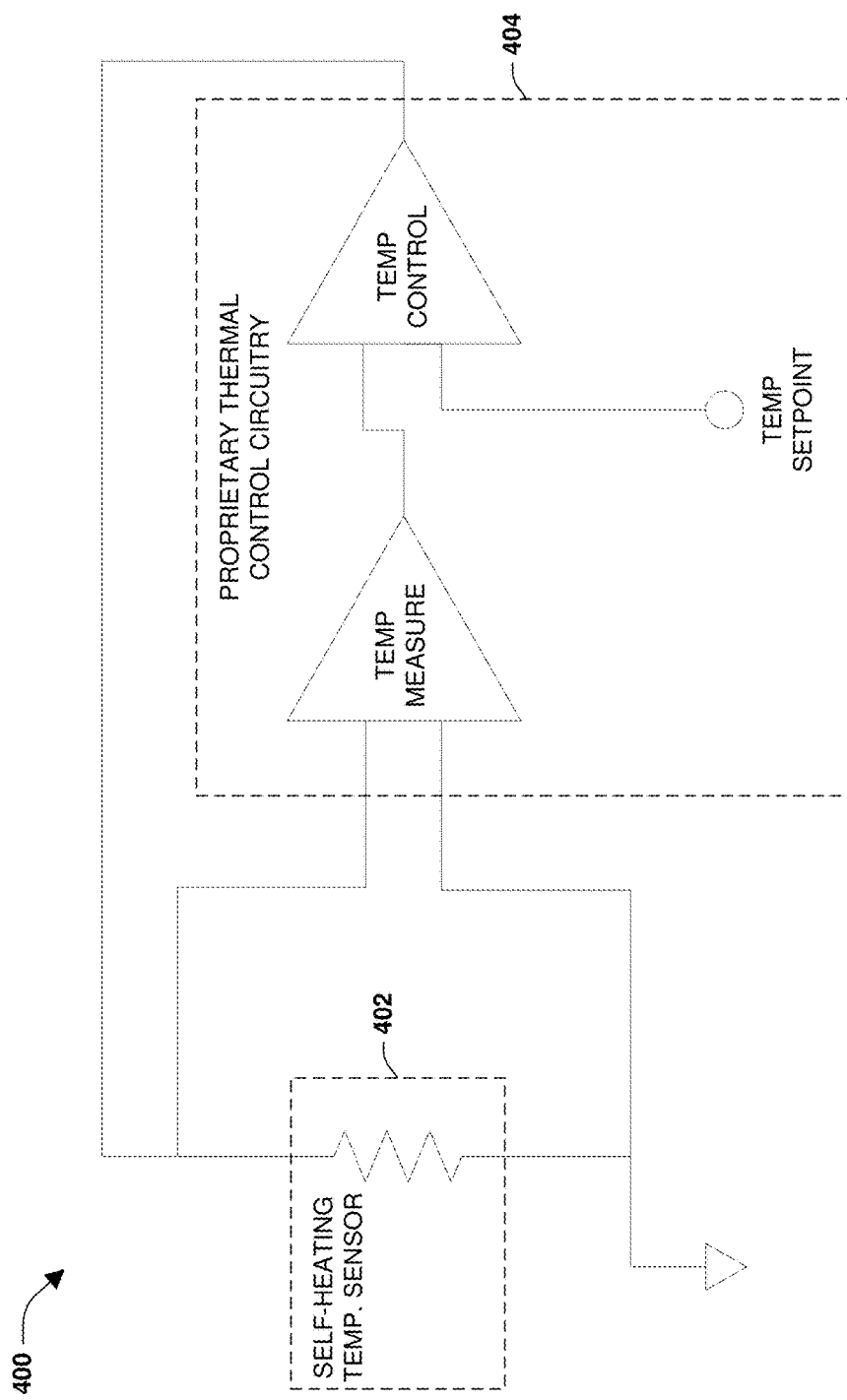
FIG. 4 is an illustration of an example electrical schematic of components and circuitry that facilitate temperature stabilization, according to one or more embodiments.

FIG. 4 depicts an example electrical schematic 400 in accordance with one or more aspects. As shown, a self-heating temperature sensor 402 (e.g., RTD) can be electrically coupled to temperature measurement and temperature control components included within a thermal control circuitry 404. In accordance with a desired temperature setpoint, RTDs 402 can measure and control temperature by varying power dissipation. In other words, RTD 402 resistance will represent a certain temperature and the power provided to the RTD 402 will be proportional to the square root of the current passing through the RTD 402. In operation, a particular setpoint temperature can be selected (e.g., 120° F.), whereby the RTD can be provided with a requisite amount of power so as to achieve the desired temperature. Within the thermal control circuitry 404, the temperature can be measured as shown. In accordance with this measured temperature, the temperature control can provide enough power to the self-heating temperature sensor (RTD) 402 to achieve the temperature setpoint as desired.

Thus, the temperature control can vary the power based on a present and/or desired temperature. Therefore, heat loss can be automatically or actively compensated for and stabilized in an active control of the thermal environment of the location(s) of the RTD(s). It will be understood that this process of regulating temperature can also be utilized with regard to all RTDs provided within systems, such as RTDs bonded to conductive metal within the protective housing as described below.

Figure 5:
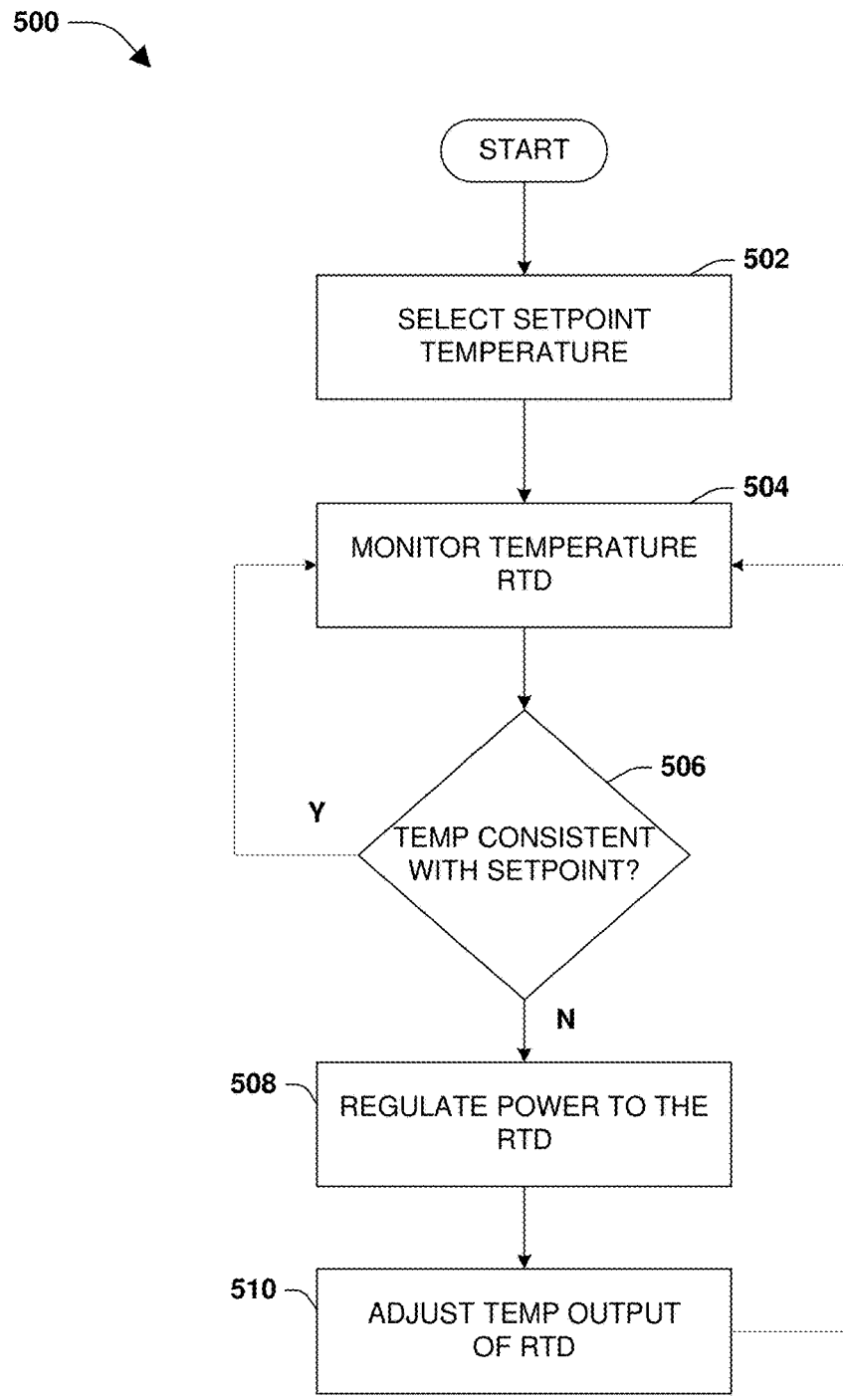
FIG. 5 is an illustration of an example method for facilitating active temperature stabilization, according to one or more embodiments.

FIG. 5 illustrates a methodology 500 of stabilizing components in an IR temperature measurement system in accordance with one or more aspects. While, for purposes of simplicity of explanation, the one or more methodologies shown herein, e.g., in the form of a flow chart, are shown and described as a series of acts, it will be understood and appreciated that one or more acts may, in accordance with one or more aspects, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

At 502, a temperature setpoint can be established. For example, a setpoint of 120° F. can be selected in aspects so as to exceed most any ambient operating conditions. As described above, an IR sensor assembly can be equipped with a number of RTDs so as to actively stabilize component temperatures. For example, a conductive frame can be equipped with RTDs so as to focus heat upon a transmissive window in a protective housing. Similarly, an RTD can be bonded to a baseplate of a thermopile and can provide temperature stabilization.

At 504, temperature can be monitored via the RTD. As will be understood, the RTDs employed in connection with one or more aspects can both monitor and deliver heat as desired. A decision is made at 506 to determine if the monitored temperature is consistent with the desired temperature setpoint. If yes, the methodology returns to 504 to monitor the temperature.

If not consistent at 506, power to the RTD can be regulated at 508. Thus, the temperature output of the RTD can be regulated (e.g., raised) at 510. As will be appreciated, the rise in temperature can effectively regulate and/or stabilize IR 'visible' components within the protective housing and within the IR measurement object-target path.

Figure 6:
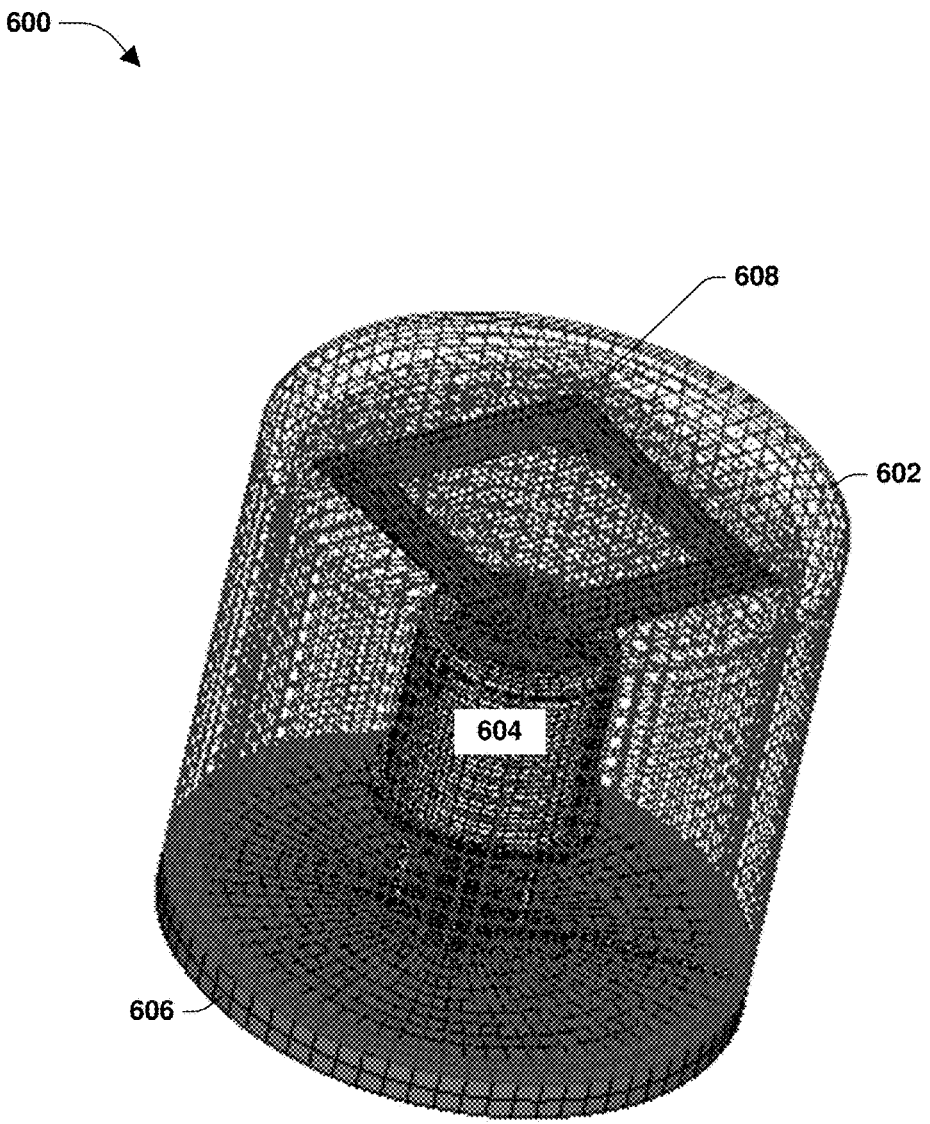
FIG. 6 is an illustration of an example self-heating temperature IR sensor assembly, according to one or more embodiments.

Referring now to FIG. 6, illustrated is an example self-heating temperature sensor assembly 600 in accordance with one or more aspects. As shown in the example of FIG. 6, a protective housing 602 encases thermopile or sensor 604. For example, the protective housing 602 shelters, shields and/or safeguards the sensor 604 from environmental effects. A circuit board 606 is provided upon which sensor 604 can be mounted. It will be understood and appreciated that circuitry can be disposed upon the board so as to control the sensor 604 for temperature measurement and thermal stabilization control via RTDs as described herein. As illustrated, the circuit board 606 is of a shape consistent with the protective housing 602. A metalized frame 608 can be provided and equipped with RTDs that facilitate self-heating functionality.

Figure 7:
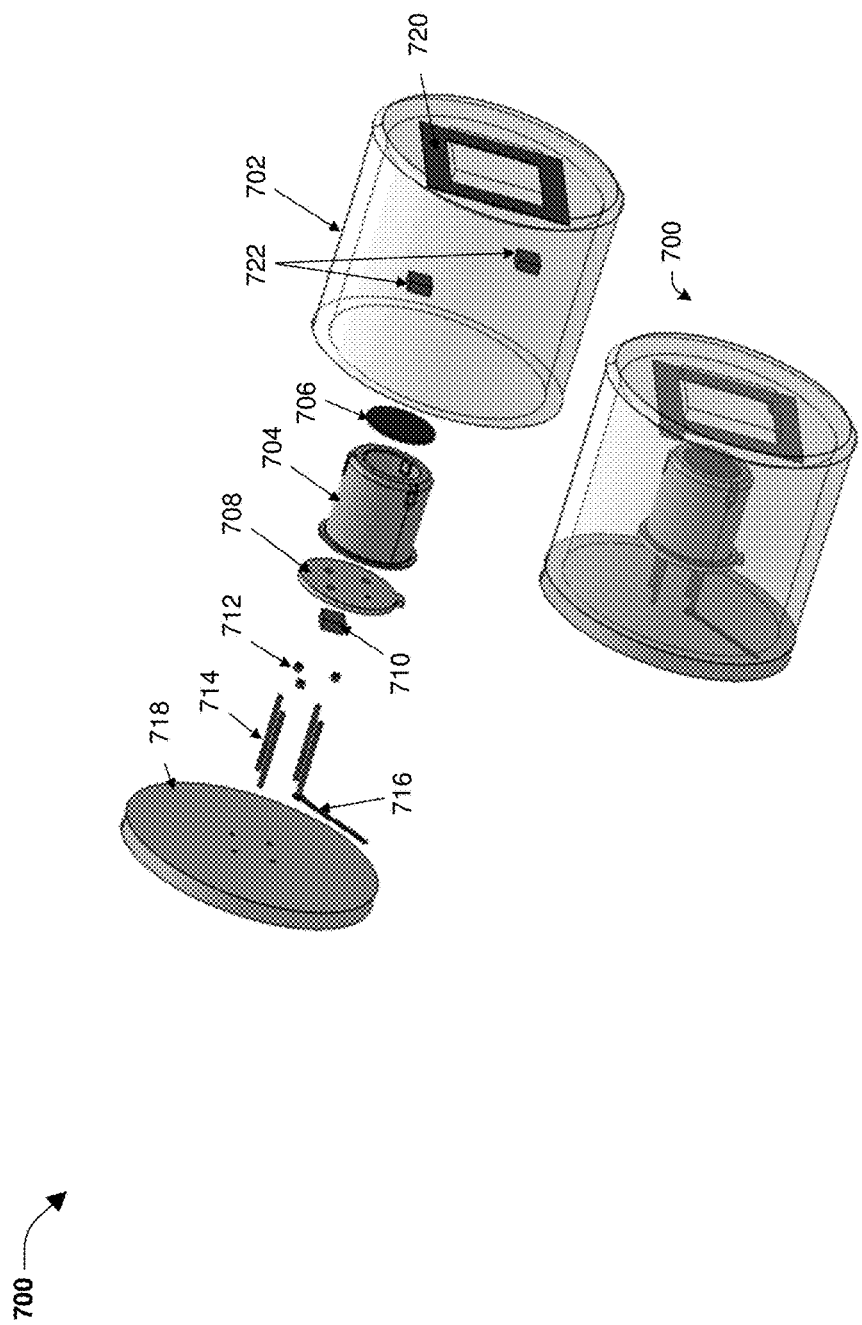
FIG. 7 is an illustration of an example exploded view of an example sensor assembly, according to one or more embodiments.

FIG. 7 illustrates an exploded (and assembled) view of a sensor assembly 700 in accordance with one or more aspects. As illustrated, the assembly 700 can include a protective housing 702 that encases sensor components. In aspects, the protective housing can be manufactured of most any plastic or suitably rigid material.

The protective housing 702 shields a sensor housing 704, for example, from environmental effects. The sensor housing 704 can be manufactured of stainless steel or most any other suitably rigid material. As illustrated in FIG. 1 discussed supra, a sensor optic lens 706 can be fitted atop the sensor housing 704. The lens 706 is transparent and can be manufactured of silicon or other suitably transparent or translucent material.

A baseplate 708 is disposed upon an end of the sensor housing 706 opposite the lens 706. In aspects, the baseplate 708 is manufactured of stainless steel. However, it will be understood and appreciated that most any suitable material can be employed without departing from the spirit and/or scope of the disclosure or claims appended hereto. A resistive temperature detector (RTD) 710 can be mounted or thermally bonded beneath the baseplate 708, thereby temperature stabilization of components (e.g., 708, 706, and 704) can be effected via RTD 710. In aspects, RTD 710 can be a ceramic RTD.

The RTDs may be capable of use in a mode that can measure temperature and deliver heat simultaneously. Thus, this single component (e.g., RTD) is capable of functionally measuring temperature while at the same time working to stabilize temperatures of other IR 'visible' components (e.g., housing, baseplate, optic lens, protective housing window, etc.). The RTDs can be controlled by a circuit that facilitates maintenance of a particular temperature or setpoint (e.g., 120° F.).

Accordingly, the circuitry can regulate power to the RTD to maintain the desired temperature. While specific temperatures and power sources are described herein, the features, functions, and benefits may be employed to maintain most any desired temperature by providing power or wattage as appropriate. It will be appreciated that stabilization of the critical component's temperature enhances accuracy and performance of the IR temperature sensing functionality.

As illustrated, glass fillers 712 can be fitted into holes of the baseplate 708. The glass fillers 712 can enhance the hermetic seal in addition to the seal of the protective housing 702 mounted onto the circuit board 718. Upon manufacture, leads, e.g., copper leads, 714 can be inserted through the glass fillers 712 and into the baseplate 708. A trace, e.g., copper trace, 716 can be provided in embodiments. A circuit board 718 can be fitted onto the open end of the protective housing 702, thereby encasing sensor components therein. It will be appreciated that the circuit board 718 can be of a shape consistent with an open end of the protective housing 702. In other aspects, a groove that is consistent with the shape of the open end of protective housing 702 can be provided so as to provide a suitable hermetic seal.

Also included within the protective housing 702 is a metalized frame, e.g., copper frame, 720. The copper frame 720 can be equipped with RTDs 722. In one aspect, RTDs 722 are ceramic detectors. While RTD 710 can detect temperature and provide heat to the baseplate 708 region, the RTDs 722 can provide heat to the protective housing window region as shown. It will be appreciated that the RTDs 722 can provide heat to the metalized frame which can conduct heat around the window. By focusing heat upon the window, temperature can be evenly stabilized to enhance IR measurement functionality.

Figure 8:
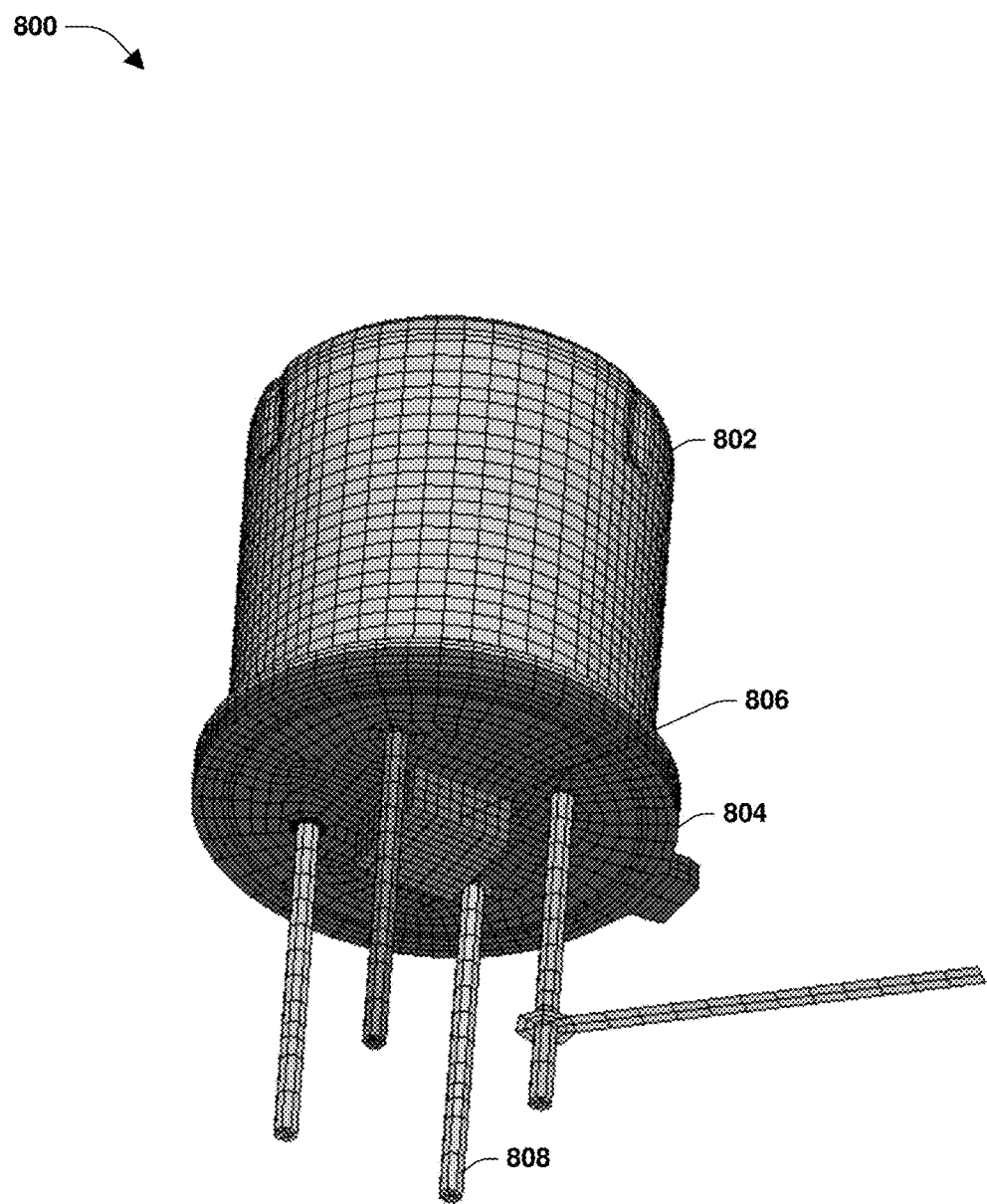
FIG. 8 is an illustration of an example bottom perspective view of an example sensor assembly, according to one or more embodiments.

FIG. 8 is a bottom perspective view of an example sensor assembly 800 in accordance with one or more aspects. As shown, the sensor assembly 800 can include a protective housing 802, a circuit board 804 and an RTD 806. Additionally copper leads 808 are provided so as to facilitate electrical connection as appropriate.

Figure 9:
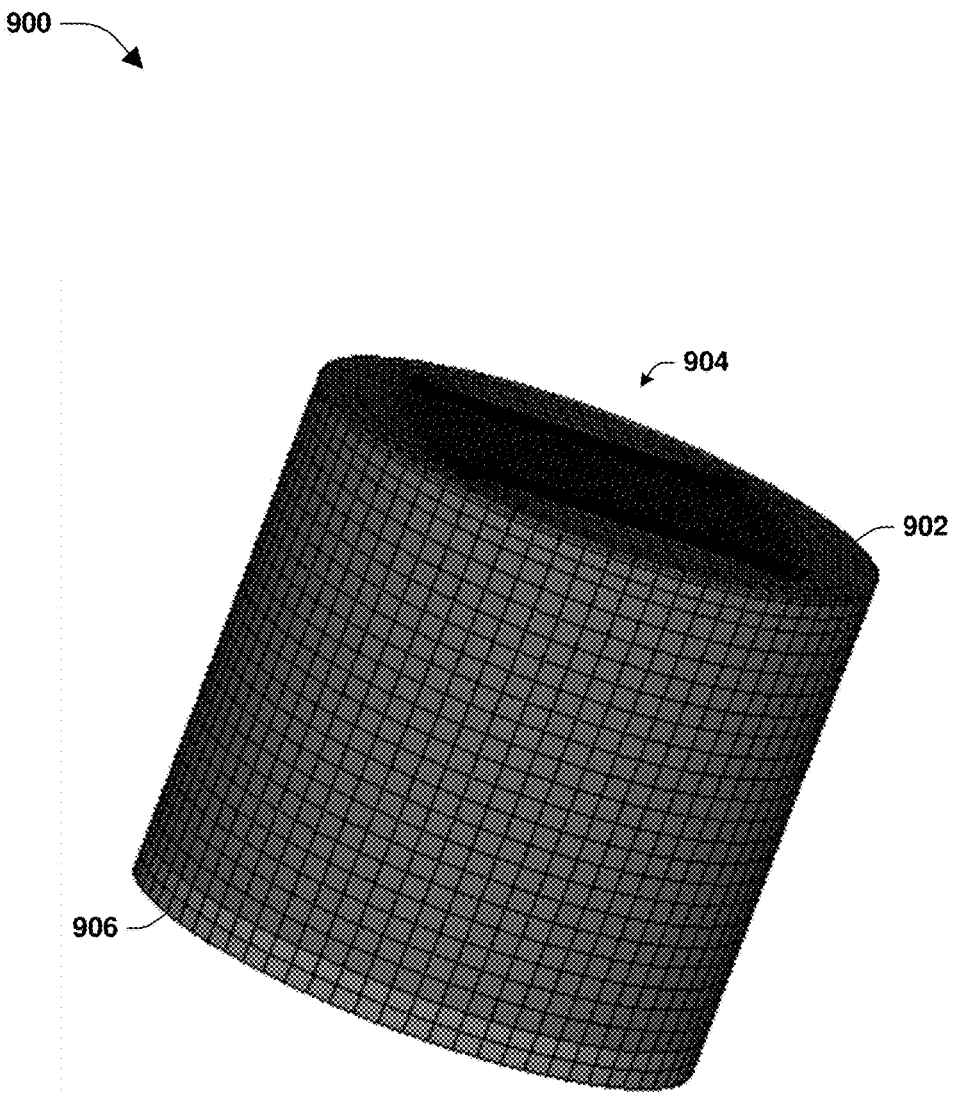
FIG. 9 is an illustration of an example side perspective view of an example sensor assembly, according to one or more embodiments.

Referring now to FIG. 9, a side perspective view of an example sensor assembly 900 is shown. As illustrated, protective housing 902 can be equipped with a translucent window 904 on the top such that IR energy can be captured via a sensor or thermopile. The bottom section of the protective housing 902 is open such that sensor components can be inserted as described with regard to FIG. 7 supra. Further, the open end of the protective housing 902 can be configured to mate to a circuit board 906, e.g., providing a waterproof or hermetic seal. It will be understood that, where appropriate, gaskets can be provided to assist with or enhance the sealing functionality.

Figure 10:
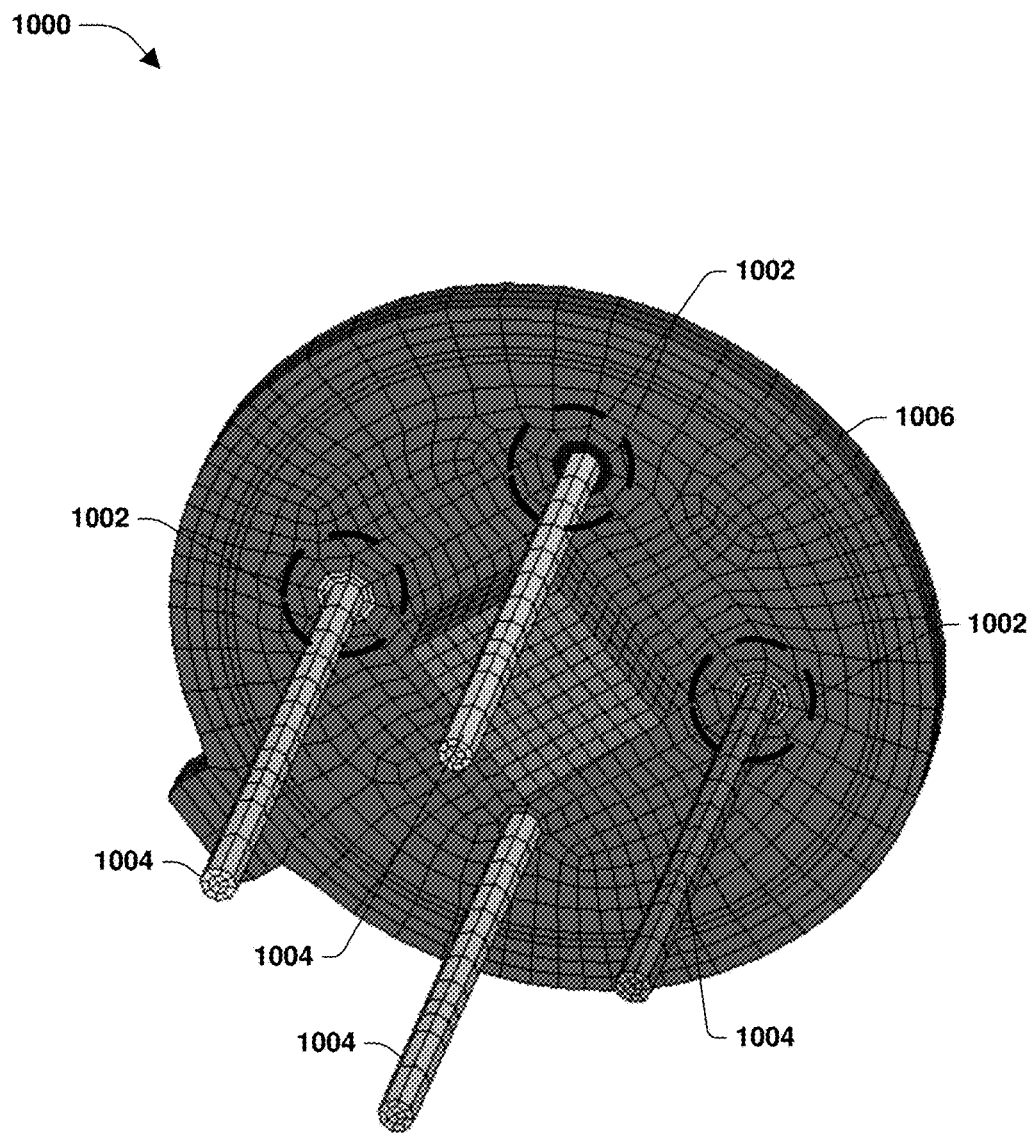
FIG. 10 is an illustration of an example bottom-up perspective view of an example sensor assembly, according to one or more embodiments.

FIG. 10 illustrates a bottom-up perspective view of an example sensor assembly 1000 in accordance with aspects. From this vantage point, placement of glass fillers 1002 can be can be seen. In other words, each of the leads 1004 is passed through a glass filler 1004 upon insertion into the circuit board 1006.

Figure 11:
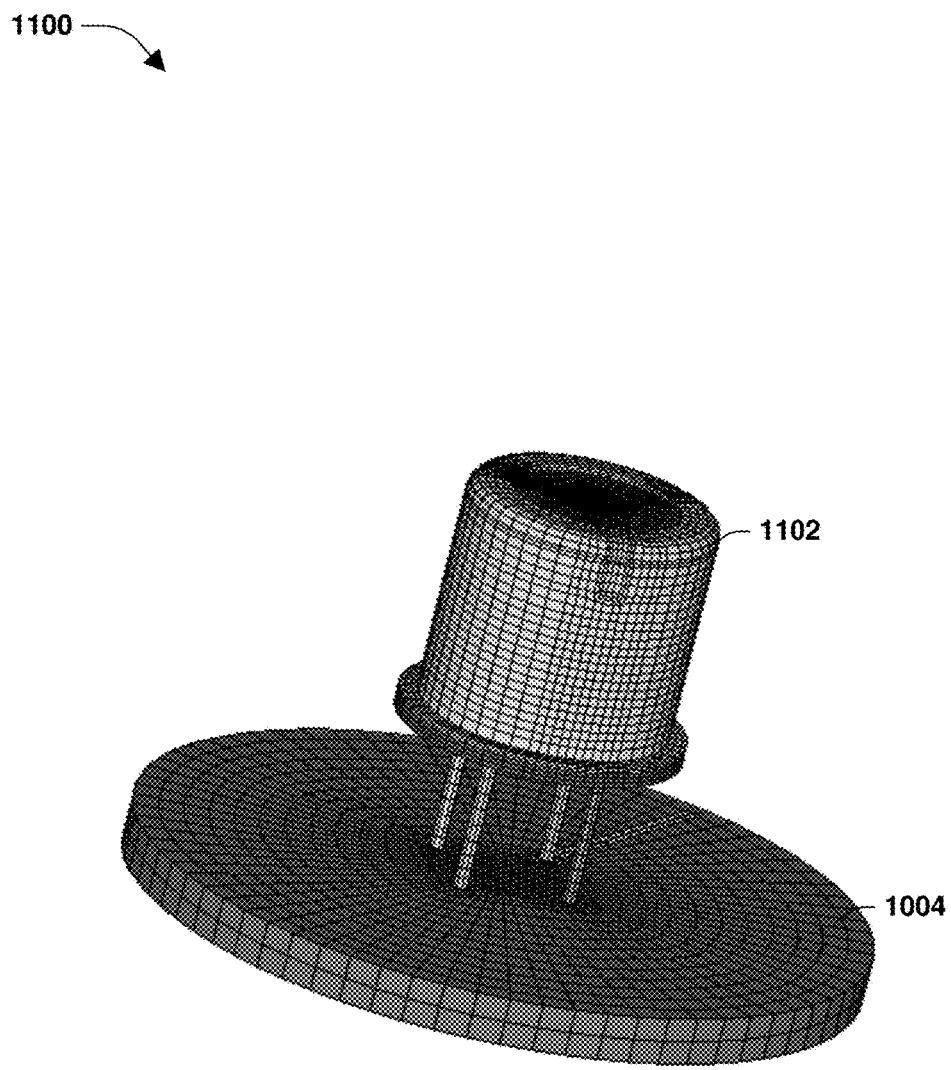
FIG. 11 is an illustration of yet another example perspective view of an assembly, according to one or more embodiments.

FIG. 11 is yet another perspective view of an assembly 1100 in accordance with aspects. As shown, a sensor component 1102 can be disposed within the center of circuit board 1104. In other aspects, the sensor component 1102 can be mounted upon an end cap that does not include circuitry. In these alternative aspects, the circuitry can be remotely located from the thermopile. It will be appreciated that this illustration is exemplary and not intended to limit alternative aspects disclosed herein.

Figure 12:
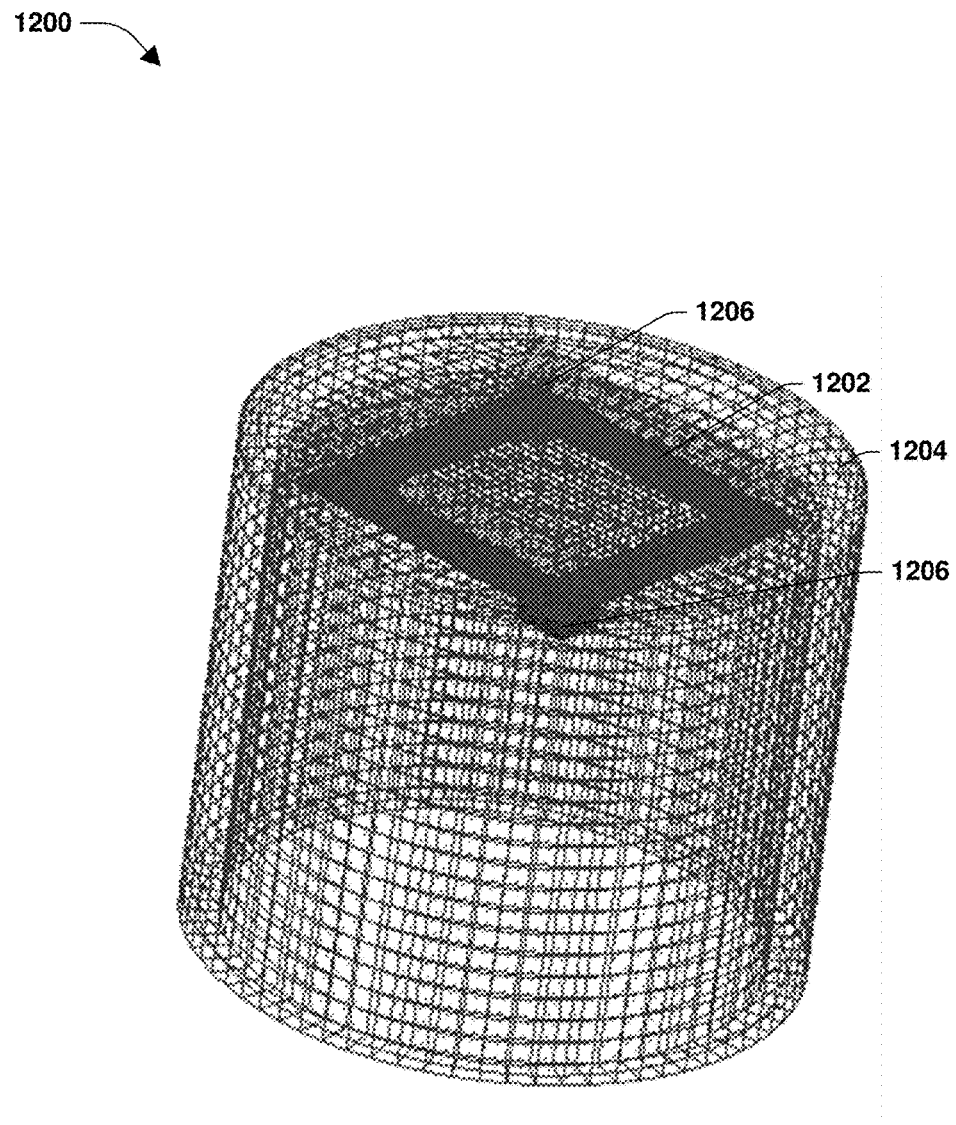
FIG. 12 is an illustration of an example placement of a conductive frame, according to one or more embodiments.

FIG. 12 illustrates an example 1200 placement of a frame 1202 within the closed face of protective housing 1204. In other words, the metal, e.g., copper, frame 1202 is encased within the protective housing 1204 together with other sensor components as described in greater detail supra. Further, the metal frame 1202 can be equipped with RTDs 1206 as shown. These RTDs 1206 can provide information necessary for temperature stabilization in accordance with the features, functions, and benefits of the disclosure. As well, the RTDs 1206 can provide heat as necessary for stabilization effect.

FIG. 13 to FIG. 16 are shown in accordance with one or more aspects. While specific heat capacities and conductivities are disclosed, it will be understood that these values and parameters are provided for perspective and are not limiting in any manner.

Figure 13:
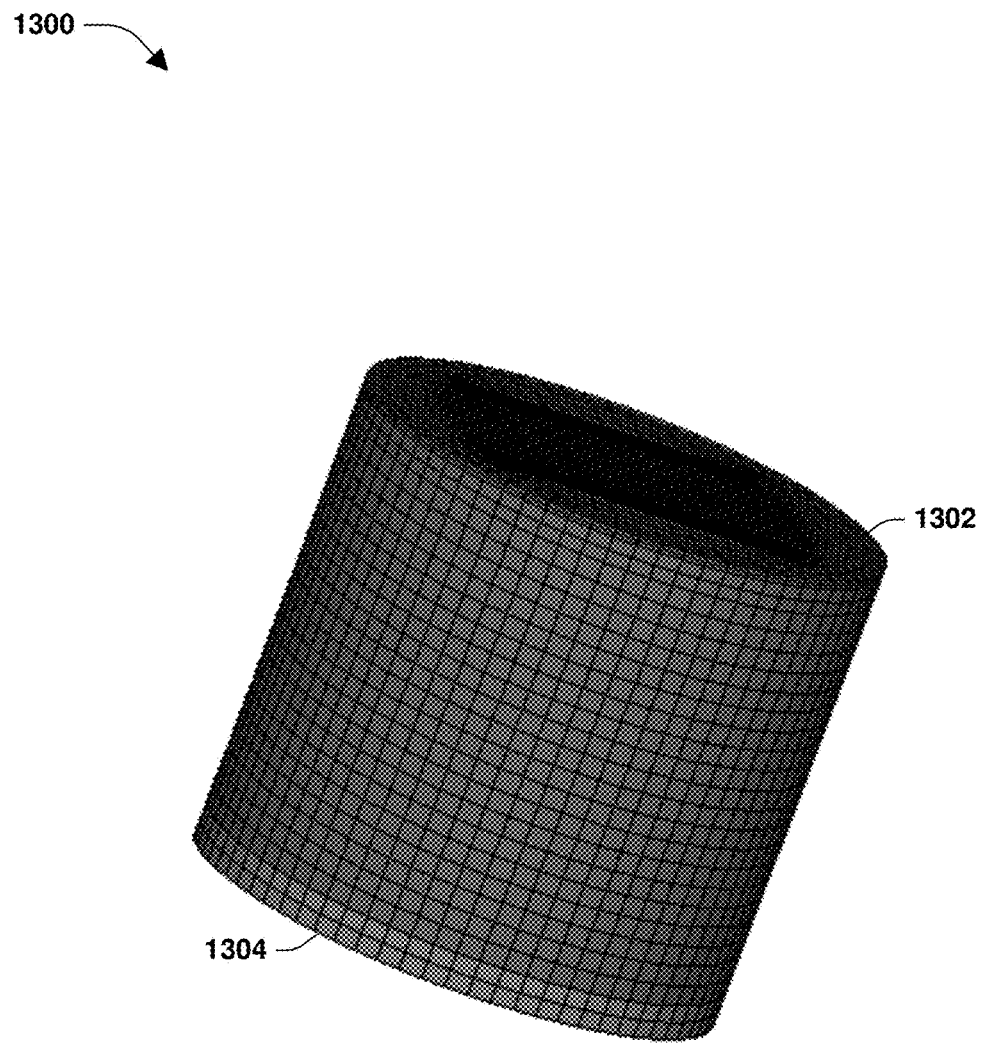
FIG. 13 is an illustration of an example side perspective view of a protective housing and circuit board base, according to one or more embodiments.

Referring first to the assembly 1300 of FIG. 13, protective housing 1302, e.g., plastic, can have a specific heat capacity of 2200 J/Kg ° K and a conductivity of 0.5 W/m ° K. Circuit board 1304 can have a specific heat capacity of 1200 J/Kg ° K and a conductivity of 0.23 W/m ° K.

Figure 14:
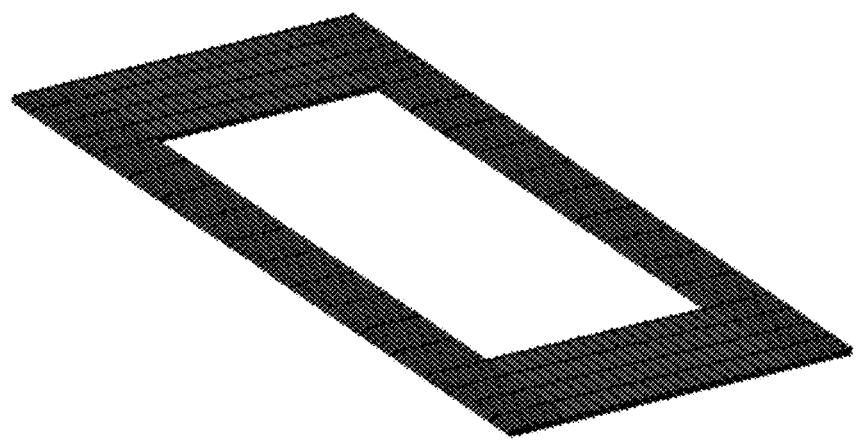
FIG. 14 is an illustration of an example conductive frame, according to one or more embodiments.
Figure 15:
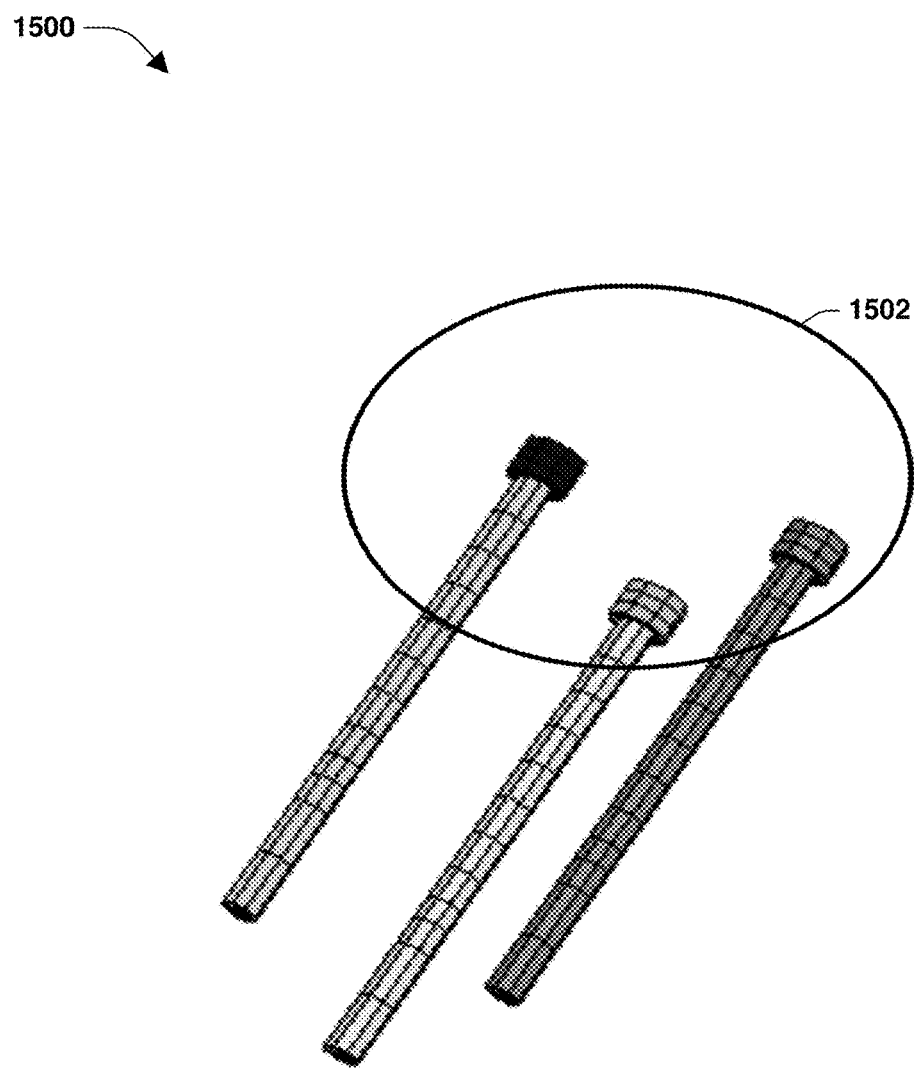
FIG. 15 is an illustration of glass fillers positioned onto leads, according to one or more embodiments.

The frame 1400 of FIG. 14 can have a specific heat capacity of 385 J/Kg ° K and a conductivity of 398 W/m ° K. The glass fillers 1502 of FIG. 15 can have a conductivity of 0.836 W/m ° K, as seen at 1500.

Figure 16:
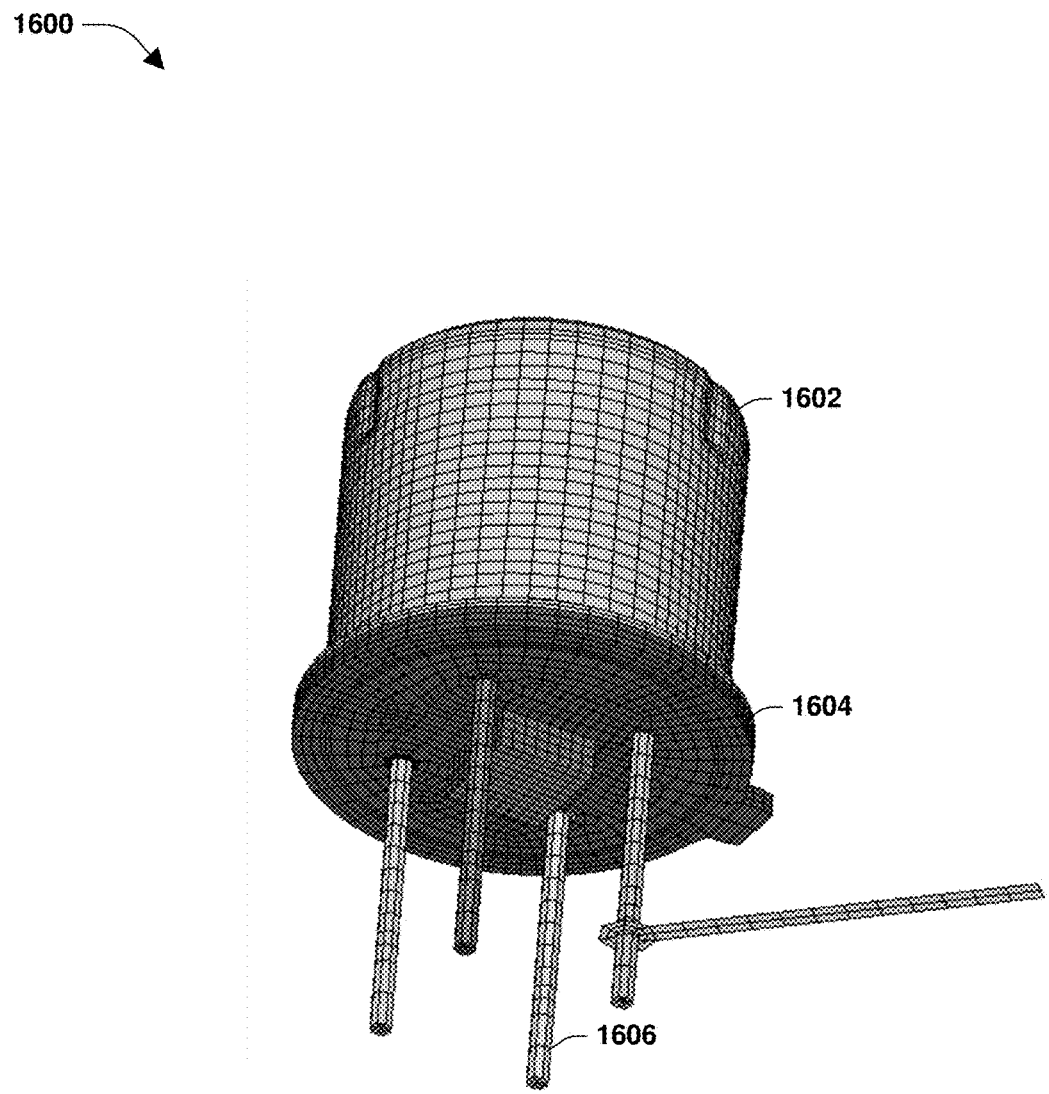
FIG. 16 is an example bottom-up perspective view of an assembly, according to one or more embodiments.

As shown in the assembly 1600 of FIG. 16, a sensor housing 1602, e.g., steel housing, can have a specific heat capacity of 477 J/Kg ° K. The sensor housing 1602 can also have a conductivity of 16.7 W/m ° K in aspects. Consistent with the sensor housing 1602, the baseplate 1604, e.g., steel, can have a specific heat capacity of 477 J/Kg ° K and a conductivity of 16.7 W/m ° K. The leads 1606, e.g., copper leads, can have a specific heat capacity of 385 J/Kg ° K and a conductivity of 398 W/m ° K.

In accordance with one or more aspects, it will be understood that heat transfer is a through conduction in a component and wherever two components come into contact. The outer surface of the protective housing can convect with the ambient temperature. The inner surface of the protective housing and the outer surface of the other components within the protective housing (e.g., sensor housing) will convect with the captive air that is trapped inside the protective housing. In embodiments, convective heat transfer coefficient of 7.9 W/MA^2 K is used.

In accordance with the aforementioned heat capacities and conductivities, a power source of 0.196 W was specified at each RTD. The ambient temperature was fixed as −20° C. Upon testing, a power source of 0.196 W was applied at each RTD. The RTDs at the copper frame to reached a temperature of about 120° F. The temperature at RTD near the baseplate for this power is 101° F. It will be understood that this amount of stabilization is sufficient to enable efficient and accurate IR temperature measurements. In other words, control circuitry can be provided so as to use the stabilized component temperatures in IR energy to temperature conversions. As a result, effects of IR 'visible' components are alleviated.

While active stabilization has been disclosed and described in detail herein, it will be understood that passive (or combinations of active and passive) stabilization embodiments are to be contemplated and included within the scope of the disclosure and claims appended hereto. For instance, in a passive embodiment, the sensor component(s) may be thermally coupled to the optics so as to effect passive stabilization. In other words, the cover (e.g., including optics) can be metalized using a conductive material (e.g., copper). Here, the passive conductivity of thermal properties via the conductive metal can be used to stabilize the temperature(s) as described herein.

Figure 17:
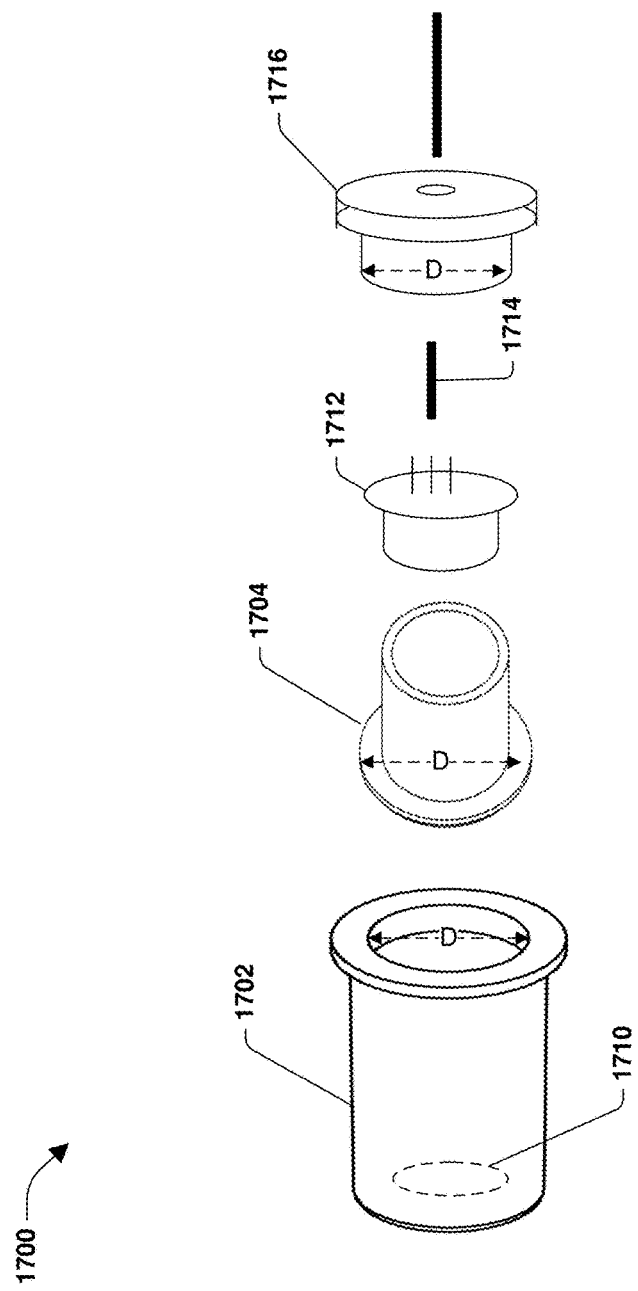
FIG. 17 is an illustration of an example infrared (IR) temperature monitoring system, according to one or more embodiments.

FIG. 17 is an illustration of an exploded view of an example infrared (IR) temperature monitoring system 1700, according to one or more embodiments. The system 1700 may provide for passive temperature stabilization by thermally bonding a protective housing 1702 or protective shell, such as a protective plastic housing, to a sensing element 1712. In one or more embodiments, the protective housing 1702 has an open end and a closed end. The protective housing 1702 may be formed of a non-thermally conductive, corrosion resistant material. Additionally, the protective housing 1702 may have an integral thin window 1710 of IR transmissive plastic. As seen in FIG. 17, the open end of the protective housing 1702 may couple with a frame, which may be formed of metal. For example, the frame 1704 may be a metallic frame or a conductive frame having an open top hat shape. It will be appreciated that the frame 1704 may be inset formed, bonded, or pressed to fit firmly against the closed end face of the protective housing 1702. The frame 1704 may be positioned upon an inner face or portion of the closed end of the protective housing 1702. In other words, the frame 1704 may be pressed into tight contact with the protective housing 1702 effectively stabilizing the otherwise non-conductive plastic window. The cylinder end may fit snuggly around the IR element 1712 or sensor element. In one or more embodiments, the snug fit may further be enhanced by the use of thermal grease or thermally conductive adhesive. The top hat in situ then thermally stabilizes and maintains a uniform temperature between the outside media and the sensing element 1712. Further stated, the frame 1704 may encompass a transmissive window in the closed end of the protective housing 1702 to facilitate providing a stable temperature around the transmissive window. Additionally, the assembly or system 1700 may include an infrared (IR) element, such as a thermopile IR detector 1712, a circuit or signal processor 1714, and a housing plug 1716 or housing seal plug.

In one or more embodiments, a sensor assembly may include the IR element 1712, the signal processor 1714, and the housing seal plug 1716, which seals the system 1700. Accordingly, the system 1700 may include the protective housing 1702, the frame 1704, and the sensor assembly. It will be appreciated that one or more of the components described herein may be bonded and/or sealed for harsh environment use. In other words, components 1702 and 1704 may be thermally coupled with 1712, 1714, and 1716 such that a temperature of a protective housing lens (e.g., within the protective housing 1702) does not disrupt an intended temperature, setpoint temperature, or target temperature measurement. In this way, the system 1700 links a temperature of an outside environment or enables an outside, external, or ambient temperature measurement to be made. Further, lens temperature compensation may be provided as well.

According to one or more aspects, infrared (IR) temperature monitoring system is provided, including a protective housing, an IR temperature sensor, and a metallic frame. The protective housing may have an open end and closed end. The IR temperature sensor may have a sensor housing which encases an IR element. The protective housing may encase the IR temperature sensor and the sensor housing. The protective housing may be a cap that shields the sensor housing from one or more environmental effects. The metallic frame may be positioned upon an inner portion of the closed end of the protective housing, wherein the metallic frame encompasses a transmissive window in the closed end of the protective housing, wherein the metallic frame provides a stable temperature around the transmissive window.

In one or more embodiments, the protective housing encases the IR temperature sensor. The IR element may be positioned on a signal processor. The metallic frame may be a conductive top hat. The system may include a housing seal plug. The protective housing may be cylindrical in shape or formed of plastic. The metallic frame may be formed of copper, aluminum, or other suitable thermal conductor/thermally conductive material. The sensor housing may be formed of plastic that acts as a lens arranged at one end of the IR element and a baseplate mounted to the other end of the IR element. The system may include one or more glass fillers that hermetically seal one or more leads traversing through a baseplate of the IR element.

According to one or more aspects, a method for infrared (IR) temperature monitoring is provided, including encasing an IR element of an IR temperature sensor with a sensor housing, encasing the IR temperature sensor and the sensor housing with a protective housing having an open end and closed end, wherein the protective housing is a cap that shields the sensor housing from one or more environmental effects, and positioning a metallic frame upon an inner portion of the closed end of the protective housing, wherein the metallic frame encompasses a transmissive window in the closed end of the protective housing, wherein the metallic frame provides a stable temperature around the transmissive window. The protective housing may include an integral lens formed of the same material as the protective housing. The IR element may be positioned on a signal processor. The signal processor may be implemented as a circuit. The housing plug or housing seal plug may fit with the assembly 1700 of FIG. 17 to complete an internal system seal impervious to one or more environmental effects.

According to one or more aspects, an infrared (IR) temperature monitoring system is provided, including a protective housing having an open end and closed end, an IR temperature sensor having a sensor housing which encases an IR element, wherein the protective housing encases the IR temperature sensor and the sensor housing, wherein the protective housing is a plastic cap that shields the sensor housing and the IR temperature element from one or more environmental effects, a metallic frame positioned upon an inner portion of the closed end of the protective housing, wherein the metallic frame encompasses a transmissive window in the closed end of the protective housing, wherein the metallic frame provides a stable temperature around the transmissive window, and a housing seal plug which completes an internal system seal impervious to external environment effects.

Although the subject matter has been described in language specific to structural features or methodological acts, it will be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. An infrared (IR) temperature monitoring system, comprising:
   a protective housing having an open end and closed end, wherein the protective housing is plastic;
   an IR temperature sensor element (sensor element) having a protective sensor housing which encases an IR element,
      wherein the protective housing encases the sensor element and the sensor housing,
      wherein the protective housing is a cap that shields the sensor element from one or more environmental effects; and
   a metallic frame positioned upon an inner portion of the closed end of the protective housing, the metallic frame encompasses a transmissive window in the closed end of the protective housing, and the metallic frame provides a stable temperature around the transmissive window,
      wherein the metallic frame is a conductive top hat,
      wherein the conductive top hat establishes a stable thermal link between the transmissive window and the sensor element.

2. The system of claim 1, wherein the IR element is positioned on a signal processor.

3. The system of claim 1, comprising a housing seal plug.

4. The system of claim 1, wherein the protective housing is cylindrical in shape.

5. The system of claim 1, wherein the metallic frame is formed of copper, aluminum, or other thermally conductive material.

6. The system of claim 1, wherein the sensor housing is formed of plastic that acts as a lens arranged at one end of the IR element and a baseplate mounted to the other end of the IR element.

7. The system of claim 1, comprising one or more glass fillers that hermetically seal one or more leads traversing through a baseplate of the IR element.

8. The system of claim 1, wherein the protective housing and metallic frame are thermally coupled such that a temperature of a protective housing lens within the protective housing does not disrupt an intended temperature, setpoint temperature, or target temperature, allowing the outside, external, or ambient temperature measurement to be made.

9. A method for infrared (IR) temperature monitoring, comprising:
   encasing a sensor element with a protective housing;
   encasing the sensor element with a protective housing having an open end and closed end, wherein the protective housing is a cap that shields the sensor element from one or more environmental effects, wherein the protective housing is plastic; and positioning a metallic frame upon an inner portion of the closed end of the protective housing, wherein the metallic frame encompasses a transmissive window in the closed end of the protective housing, wherein the metallic frame provides a stable temperature around the transmissive window, wherein the metallic frame is a conductive top hat.

10. The method of claim 9, wherein the protective housing comprises an integral lens formed of the same material as the protective housing.

11. The method of claim 9, wherein the sensor element is positioned on a signal processor.

12. The method of claim 11, wherein the signal processor is implemented as a circuit.

13. The method of claim 9, wherein a housing seal plug completes an internal system seal impervious to one or more of the environmental effects.

14. The method of claim 9, wherein the protective housing is cylindrical in shape.

15. The method of claim 9, wherein the metallic frame is formed of copper, aluminum, or other thermally conductive material.

16. The method of claim 9, wherein the protective housing and metallic frame are thermally coupled such that a temperature of a protective housing lens within the protective housing does not disrupt an intended temperature, setpoint temperature, or target temperature, allowing the outside, external, or ambient temperature measurement to be made.

17. An infrared (IR) temperature monitoring system, comprising:

a protective housing having an open end and closed end;

an IR temperature sensor having a sensor housing which encases an IR element, wherein the protective housing encases the IR temperature sensor and the sensor housing, wherein the protective housing is a plastic cap that shields the sensor housing and the IR temperature sensor from one or more environmental effects;

a metallic frame positioned upon an inner portion of the closed end of the protective housing, wherein the metallic frame encompasses a transmissive window in the closed end of the protective housing, wherein the metallic frame provides a stable temperature around the transmissive window; and a housing plug to complete an internal system seal impervious to one or more of the environmental effects, wherein the IR temperature sensor is actively stabilized using temperature control components, including resistive temperature devices, and circuitry.

* * * * *